United States Patent [19]
Neidlinger et al.

[11] Patent Number: 5,491,575
[45] Date of Patent: Feb. 13, 1996

[54] PASSIVE OPTICAL TELECOMMUNICATION SYSTEM

[75] Inventors: Stephan Neidlinger; Thomas Bolze, both of Munich, Germany

[73] Assignee: Siemens Aktiengesellschaft, Munich, Germany

[21] Appl. No.: 191,472

[22] Filed: Feb. 4, 1994

[30] Foreign Application Priority Data

Mar. 30, 1993 [EP] European Pat. Off. ............. 93105294

[51] Int. Cl.$^6$ .................................................. H04J 14/08
[52] U.S. Cl. ........................ 359/137; 359/168; 359/152
[58] Field of Search ..................................... 359/118, 125, 359/137, 152, 157, 113, 114, 164, 167–168; 370/95.1–95.3, 104.1; 385/24; 340/825.08

[56] References Cited

U.S. PATENT DOCUMENTS 5,373,386  12/1994  Bolze .................................... 359/167

FOREIGN PATENT DOCUMENTS

| | | | |
|---|---|---|---|
| 0171080 | 2/1986 | European Pat. Off. ............... | 359/137 |
| 0482943 | 4/1992 | European Pat. Off. . | |
| 4016359 | 11/1991 | Germany . | |
| 8905077 | 6/1989 | WIPO .................................... | 359/137 |

OTHER PUBLICATIONS

"A Hybrid Approach to the Transmission of Telephony Over a Passive Optical Network", Mudhar, Int. J. Digital and Analog Comm. Syst. vol. 5 (1992) pp. 77–83.

"Passive Fibre Local Loop for Telephony with Broadband Upgrade", Oakley et al ISSLS '88 International Symposium on Subscriber Loops and Services, pp. 9.4.1–9.4.5.

"Subcarrier Multiplexing for Multiple–Access Lightwave Networks", Darcie, J. Lightwave Tech. vol. LT–5, No. 8, Aug. 1987 (pp. 1103–1110).

"The Provision of Telephony Over Passive Optical Networks" Hoppitt et al Br. Telecom. Technol. J., vol. 7, No. 2, Apr. 1989, pp. 100–114.

"A Passive Double Star Optical Subscriber System with Frequency Division Duplex Transmission and Flexible Access", Kaede et al, IEICE Trans. Commun. vol. E75–B, No.9, Sep. 1992, pp. 841–849.

"Introduction to Communications Systems" Stremler, pp. 461–464 and 480–482.

*Primary Examiner*—Leo H. Boudreau
*Assistant Examiner*—Kinfe-Michael Negash
*Attorney, Agent, or Firm*—Hill, Steadman & Simpson

[57] ABSTRACT

In a passive optical telecommunication system having a central station communicating via respective optical waveguides with a number of decentralized stations, an electrical carrier signal is DPSK-modulated in the upstream transmission, after which the electrical signal modulated in this way effects the intensity modulation of the emitted light; in the downstream signal transmission, the emitted light is intensity-modulated by a preferably scrambled NRZ baseband signal. The carrier signal is derived by frequency multiplication from the regenerated reception clock signal of the decentralized station.

9 Claims, 1 Drawing Sheet

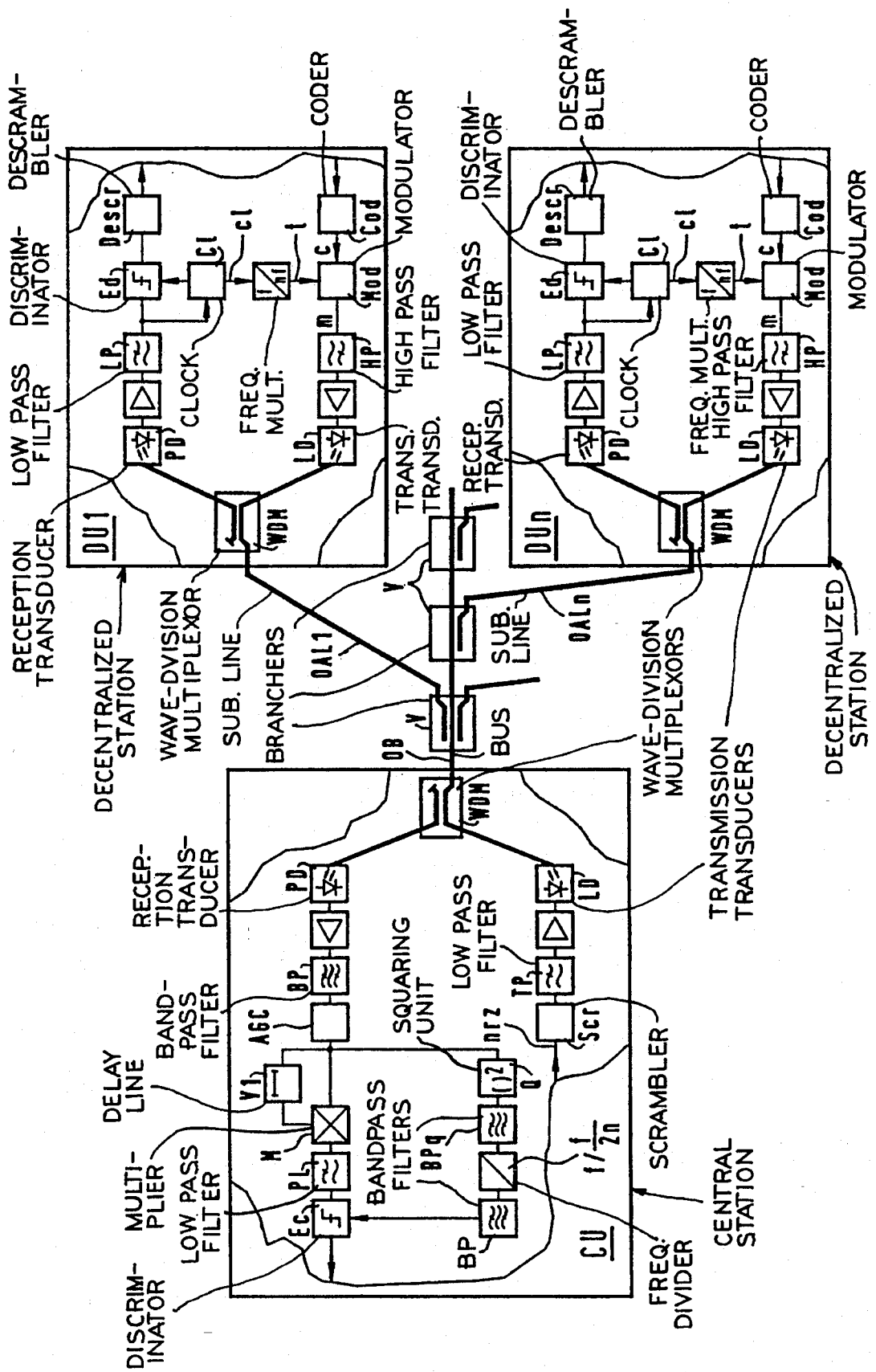

PASSIVE OPTICAL TELECOMMUNICATION SYSTEM

BACKGROUND OF THE INVENTION

1. Field of the Invention

The present invention is directed to a passive optical telecommunication system of the type having a central station which communicates via respective waveguides with a plurality of decentralized locations.

2. Description of the Prior Art

Recent developments in telecommunications technology have led to passive optical telecommunication systems wherein a plurality of decentralized stations (subscriber locations, or so-called distant units respectively combining a plurality of subscriber locations) are respectively connected via their own light waveguide subscriber line to an optical brancher. The optical brancher is connected directly or via at least one further optical brancher to a common light waveguide terminal of a central station—particularly an exchange—via a light waveguide bus. Such systems are described in European Application 0 171 080; "Passive Fibre Local Loop for Telephone with Broadband Upgrade," Oakley et al., ISSLS'88, Conf. Papers pp. 9.4.1–9.4.5; and "The Provision of Telephony over Passive Optical networks," Hoppitt et al., BR Telecom Technol. J. Vol. 17 (1989) pp 100–113).

In such a passive optical telecommunication system, the signal transmission proceeding from the central station to the decentralized stations can proceed in a TDM (time division multiplexed) cell stream from which each decentralized station accepts only the cells intended for this decentralized station, and the signal transmission proceeding from the decentralized station to the central station can ensue in a TDMA (time division multiple access) method, in accord with which a decentralized station transmits each burst synchronized with the assistance of a delay means that is set in station-associated (dependent) fashion proceeding from the central station as described in German OS 4 016 359.

The signal transmission from the central station downstream to the decentralized stations and the signal transmission proceeding from a decentralized station upstream to the central station can thereby proceed in the same wavelength window (for example, common-frequency wavelength operation at 1.3 μm).

Such passive optical telecommunication systems are known, for example, from IEICE Trans. Commun., Vol. E75-B (1992) No. 9. pp 841–848 or from the J. Dig. and Anal. Commun. Sys., Vol. 5 (1992), pp. 77–83), wherein the emitted light is intensity-modulated in the electro-optical transducer (laser diode) of the central station with a PSK-modulated pulse-like signal for signal transmission downstream from the central station to the decentralized stations and wherein the emitted light is intensity-modulated with a baseband signal in the electro-optical transducers (laser diodes) of each decentralized station for signal transmission upstream from a decentralized station to the central station.

A spectral separation of the signals of different transmission directions thus becomes possible in the electrical part of the receiver; disturbances due to increased shot noise, amplitude noise (RIN-Relative Intensity Noise) of the light source and a possible heterodyne effect are thereby not suppressed. Since a burst-like signal is present in the baseband in the upstream direction, special measures for a fast, time-dependent and amplitude-dependent response of the receiver of the central station are required in general, particularly in the case of different signal levels of the signals arriving in the central station proceeding from the individual decentralized stations. For example, the use of CMI channel coding is known for this purpose, however, this produces an elevated transmission speed (or modulation rate) and thus a need for increased bandwidth, which in turn results in a lower receiver sensitivity.

SUMMARY OF THE INVENTION

It is an object of the present invention to provide a passive optical telecommunication system which avoids the aforementioned disadvantages in the telecommunication systems of the type described above.

The invention is directed to a passive optical telecommunication system wherein each of a plurality of decentralized stations (subscriber stations or so-called distant units which respectively combine a plurality of subscriber stations) is connected via its own light waveguide subscriber line to an optical brancher that is connected directly or via at least one further optical brancher to a common light waveguide terminal of the central station (such as an exchange) via a light waveguide bus. The downstream signal transmission proceeding from the central station to the decentralized station proceeds in a TDM cell stream from which each decentralized station accepts only the cells intended for this decentralized station, and the upstream signal transmission proceeding from each decentralized station to the central station proceeds in a burst mode in a TDMA method. In accordance with the invention each decentralized station in this telecommunication system includes means for intensity modulating the light emitted by the electro-optical transducer (laser diode) of that decentralized station in the upstream signal transmission, using an electrical carrier signal preferably having a carrier frequency $f_T \_ n \cdot f_B$, wherein $f_B$ is the useful signal bit rate and n is an integer, this electrical carrier signal being digitally modulated in each decentralized station with the respective source-coded useful signal. The electrical signal modulated in this way effects the intensity modulation.

While avoiding the aforementioned disadvantages, the invention advantageously enables, first, a high-pass transmission at the receiver side in the upstream transmission of burst signals, and second, enables a simple clock regeneration or resynchronization given an appropriately selected carrier frequency, and thus makes a fast as well as amplitude-dependent and time-dependent response of the receiver of the central station possible. This possibility is achieved in a specific manner in a further embodiment of the invention, wherein the electrical carrier signal is PSK-modulated, which results in the same receiver sensitivity as in the case of (uncoded) baseband transmission.

In a further embodiment of the invention, the electrical carrier signal is DPSK-modulated (differential phase shift keying) with the respective useful signal, in which case the carrier synchronization at the reception side can be foregone in the central station, thereby achieving a loss of only approximately 0.5 dB given a bit error rate of $10^{-9}$.

In a further embodiment of the invention, the light emitted in downstream direction by the electro-optical transducer (laser diode) of the central station in the downstream signal transmission can be intensity-modulated by a NRZ (non-return to zero) baseband signal, particularly by a scrambled NRZ signal, in order to assure a reliable clock regeneration in the decentralized station.

In a further embodiment of the invention, the carrier signal can be acquired by frequency multiplication from the regenerated reception clock signal of the decentralized station.

DESCRIPTION OF THE DRAWINGS

Further characteristics of the invention may be seen from the following description with reference to the drawing wherein a bidirectional light waveguide telecommunication system of the invention is schematically shown.

DESCRIPTION OF THE PREFERRED EMBODIMENTS

In the bidirectional light waveguide telecommunication system outlined in the drawing, a passive (preferably monomode) light waveguide bus network extends between a central telecommunication station CU, which, for example, can be an exchange, and a plurality of, for example 64, decentralized telecommunication stations DU1 ... DUn. Such decentralized telecommunication stations DU1 ... DUn can be subscriber stations or so-called distant units respectively combining a plurality of subscriber stations. Each station (central and decentralized) includes interface station provided with an electro-optical transmission transducer LD and with an opto-electrical reception transducer PD that are capable of respectively combining or splitting up to, for example, 32 ISDN B-channels, potentially with the assistance of a multiplexer or demultiplexer that lies at the electrical side of the transmission or reception transducer and is not shown in further detail in the drawing. In this light waveguide telecommunication system, each decentralized station DU is connected via a single-fiber light waveguide bus OB to a common light waveguide multiplexed terminal of the central telecommunication station CU. The light waveguide subscriber lines OAL 1 ... OALn belonging to the individual decentralized station DU 1, ..., DUn can be connected to the appropriate light waveguide bus OB via passive, optical branchers V—accommodated, for example, in cable brancher housings—either directly or via more such branchers as well. For example, tandem mixers or optical directional couplers can be employed as the optical branchers V. As indicated in the drawing, it is also possible, as is known (for example, from European Application 0 171 080), to provide common optical branchers shared by a plurality of light waveguide subscriber lines (OAL).

In the telecommunication system outlined in the drawing, the decentralized telecommunication station DU1, ..., DUn be each provided with an opto-electrical reception transducer PD having a PIN-photodiode and with an electro-optical transmission transducer LD having a laser diode. For decoupling the electro-optical transducer LD and opto-electrical reception transducer PD and also for directional separation, a wavelength-division multiplexer WDM is inserted between the associated light waveguide subscriber line OAL-OB and both the opto-electrical reception transducer PD and electro-optical transmission transducer LD of each station.

For intensity modulation of the light emitted by the electro-optical transducer LD of a particular decentralized station DU for upstream signal transmission, the carrier signal supplied to a digital modulator Mod, preferably a DPSK modulator, via a carrier signal line t, is digitally modulated in each decentralized station DU1 ..., DUn with the respective source-coded useful signal supplied to the digital modulator Mod by a coder Cod proceeding via a useful signal line c. After high-pass filtering in a high-pass filter HP and following amplification, the electrical signal modulated in this way effects the intensity modulation of the light emitted by the electro-optical transducer LD. The high-pass filtering effects a reduction of the noise signal that is charged with the transmission-side modulation and is contained in a light wave reflected in the optical network that proceeds back to the opto-electrical reception transducer PD of the decentralized station DU.

For intensity modulation of the light emitted by the electro-optical transducer LD of the central station CU for downstream transmission in the opposite transmission direction, the useful signal appearing in the central station CU in the form of a NRZ (nonreturn to zero) baseband signal is first supplied via a useful signal line nrz to a scrambler Scr, and is then supplied to the modulation input of the electro-optical transducer LD as a scrambled NRZ signal after low-pass filtering in a low-pass filter TP, and amplification. The low-pass filtering effects a reduction of the noise signal charged with the transmission-side modulation that is contained in a light wave that is reflected in the optical network and proceeds back to the opto-electrical reception transducer APD of the centralized station CU.

After the transmission in the passive optical network OB-OAL, the light signal received in downstream direction in the PIN photodiode receiver PD of the respective decentralized station DU in the plurality of decentralized stations DU 1, ..., DUn is converted into an electrical signal. This electrical signal—after amplification and baseband filtering in a low-pass filter LP according to the drawing—is then supplied to a discriminator Ed such as a Schmitt trigger, where it is sampled and amplitude-regenerated in order, finally, to be in turn descrambled in a following descrambler Descr.

For sampling the reception signal which is to have its amplitude regenerated in the discriminator Ec, the reception signal clock is regenerated in a clock generator Cl. The regenerated clock signal appearing at the output Cl of the clock generator Cl can now also be utilized for generating the carrier signal for the upstream transmission. The clock frequency $f_B$ is multiplied n times (n being an integer) in a frequency multiplier f/nf; the carrier signal having the carrier frequency $f_T = n \cdot f_B$ then appears at the output t of the frequency multiplier f/nf. When this occurs in all decentralized stations DU1 ..., DUn, then the carrier frequencies of all decentralized station are identical to one another within the framework of the precision of the clock regeneration. The carrier signal t that, for example, can have a frequency of 140 MHz for n=2 and a frequency of 280 MHz for n=4, is then phase-modulated by the useful signal in the digital modulator Mod of the respective decentralized station DU, preferably DPSK-modulated (differential phase shift keying). Since the information given DPSK modulation is coded by the presence or absence of a phase change, the useful signal supplied from the coder Cod via the useful signal line c must be appropriately source-coded. As set forth above, the modulated signal ultimately effects the intensity modulation of the light transmitted by the particular decentralized station DU in the upstream direction.

After optical transmission in the passive optical network OAI-OB, the optical signal received in upstream direction is converted into an electrical signal in the central station CU in an electro-optical transducer PD formed with an avalanche photodiode, this electrical signal being in turn demodulated after amplification and after passing through a bandpass filter BP. Since HF demodulators usually work at specific levels, a level control is necessary given different levels of the signal bursts received proceeding from the individual decentralized stations DU1, . . . , DUn. It is indicated for this purpose in the drawing that an AGC (Automatic Gain Control) circuit can be inserted between the bandpass BP and the following demodulator circuit.

As is likewise indicated in the drawing, a DPSK-Demodulator can be formed with a multiplier M to which the signal to be demodulated is dually supplied, directly and via a one-bit delay element V1. As can also be seen from the drawing, the multiplexer M is followed by a low-pass filter PL connected to a discriminator Ec for the received signal.

When, as set forth above, the carrier frequency is $f_T = n \cdot f_B$, wherein $f_B$ is the useful signal bit rate, then the clock signal can be regenerated in the central station CU by carrier recovery and frequency division and can be utilized for the time control of the discriminator Ec. It is indicated for this purpose in the drawing that the electrical reception signal of the central station CU appearing at the output of the AGC circuit is also supplied to a squaring unit Q whose output side leads via a bandpass filter BPq to a 1:2n frequency divider f/2n/f. After another bandpass filtering, the frequency-reduced signal then forms the clock signal for the amplitude discriminator Ec of the central station CU.

In a passive optical telecommunication system of the type initially described, signal transmission conforming to the invention enables bit rates of approximately 70 Mbit/s given a splitting factor of 64 and line lengths of 10 km. There is also the possibility of an electrical spectral separation of downstream and upstream signals, this being potentially of significance for a bidirectional signal transmission via the same optical fiber. The invention, however, is not limited to a bidirectional signal transmission in single-fiber telecommunication systems but also forms an alternative to channel coding in passive optical telecommunication systems having light waveguide fiber pairs for interactive services.

Although modifications and changes may be suggested by those skilled in the art, it is the intention of the inventors to embody within the patent warranted hereon all changes and modifications as reasonably and properly come within the scope of their contribution to the art.

We claim as our invention:

1. A passive optical telecommunication system comprising:

a central station;

a plurality of decentralized stations;

a plurality of optical waveguide means respectively connected between said central station and said decentralized stations for permitting bidirectional optical communication between said central station and said decentralized stations, central station electro-optical transducer means for transmitting downstream optical signals in a TDM cell stream via said optical waveguide means to all of said decentralized stations;

decentralized station opto-electrical transducer means at each decentralized station for receiving a cell in said downstream optical signals intended for that decentralized station;

decentralized station electro-optical transducer means in each decentralized station for transmitting burst mode upstream optical signals in TDMA from that decentralized station to said central station, said upstream optical signals having an intensity;

central station opto-electrical transducer means in said central station for receiving the respective upstream optical signal from each decentralized station;

means in each decentralized station for intensity-modulating the upstream optical signal from that decentralized station, including means for generating an electrical carrier signal and modulator means for modulating said electrical carrier signal with a source-coded useful signal to obtain a modulated electrical signal, said modulated electrical signal being supplied from said modulator means to the electro-optical transducer means in that decentralized station and effecting intensity modulation of the upstream optical signal therefrom; and in each decentralized station, a high-pass filter connected between said modulator means and the electro-optical transducer means in that decentralized station.

2. A passive optical telecommunication system as claimed in claim 1 wherein said source-coded useful signal has a useful signal bit rate $f_B$, and wherein said means for generating an electrical carrier signal comprises means for generating an electrical carrier signal having a frequency $f_T = n \cdot f_B$, n being an integer.

3. A passive optical telecommunication system as claimed in claim 1 wherein said modulator means comprises means for PSK modulating said electrical carrier signal with said source-coded useful signal to obtain a PSK-modulated electrical signal.

4. A passive optical telecommunication system as claimed in claim 1 wherein said modulator means comprises means for DPSK modulating said electrical carrier signal with said source-coded useful signal to obtain a DPSK modulated electrical signal.

5. A passive optical telecommunication system as claimed in claim 1 wherein said downstream optical signals from said central station electro-optical transducer means have an intensity, and further comprising means for intensity-modulating said downstream optical signals with a NRZ baseband signal.

6. A passive optical telecommunication system as claimed in claim 5 further comprising, in said central station, a low-pass filter connected between said central station electro-optical transducer and said means for modulating with a NRZ baseband signal.

7. A passive optical telecommunication system as claimed in claim 1 wherein said downstream optical signals from said central station electro-optical transducer means have an intensity, and further comprising means for intensity-modulating said downstream optical signals with a scrambled NRZ baseband signal.

8. A passive optical telecommunication system as claimed in claim 7 further comprising, in said central station, a low-pass filter connected between said central station electro-optical transducer and said means for modulating with a scrambled NRZ baseband signal.

9. A passive optical telecommunication system as claimed in claimed 1 further comprising:

in each decentralized station, means for regenerating a reception clock signal from the downstream optical signal received at that decentralized station; and wherein said means for generating an electrical carrier signal comprises means for deriving said electrical carrier signal by frequency multiplication from said regenerated reception clock signal.

* * * * *